United States Patent
McKinlay et al.

(10) Patent No.: US 8,885,300 B2
(45) Date of Patent: Nov. 11, 2014

(54) MAGNETIC ELEMENT WITH A BI-LAYER SIDE SHIELD

(71) Applicant: Seagate Technology LLC, Cupertino, CA (US)

(72) Inventors: Shaun Eric McKinlay, Eden Prairie, MN (US); Zhiguo Ge, Lakeville, MN (US); Eric Walter Singleton, Maple Plain, MN (US); Mohammed Shariat Ullah Patwari, Eden Prairie, MN (US); Victor Boris Sapozhnikov, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/761,226

(22) Filed: Feb. 7, 2013

(65) Prior Publication Data
US 2014/0218823 A1 Aug. 7, 2014

(51) Int. Cl.
G11B 5/39 (2006.01)
G11B 5/11 (2006.01)

(52) U.S. Cl.
CPC ..................... G11B 5/112 (2013.01)
USPC ....................................... 360/319

(58) Field of Classification Search
CPC ................. G11B 2005/3996; G11B 5/3906; G11B 5/3912; G11B 5/3932; G11B 5/398; G11B 5/39; G11B 5/11

USPC ....................... 360/319, 324–324.2
See application file for complete search history.

(56) References Cited

U.S. PATENT DOCUMENTS

| | | |
|---|---|---|
| 6,903,906 B2 | 6/2005 | Morinaga et al. |
| 6,943,993 B2 | 9/2005 | Chang et al. |
| 7,426,096 B2 | 9/2008 | Shimazawa et al. |
| 7,446,979 B2 | 11/2008 | Jayasekara |
| 7,599,151 B2 | 10/2009 | Hatatani et al. |
| 7,978,431 B2 | 7/2011 | Han et al. |
| 8,085,500 B2 | 12/2011 | Yazawa et al. |
| 8,125,746 B2 | 2/2012 | Dimitrov et al. |
| 2003/0174446 A1* | 9/2003 | Hasegawa ...................... 360/319 |
| 2003/0189802 A1* | 10/2003 | Morinaga et al. ......... 360/324.12 |
| 2005/0157431 A1* | 7/2005 | Hatatani et al. ................ 360/319 |
| 2007/0030603 A1* | 2/2007 | Sato et al. ...................... 360/324 |
| 2009/0166184 A1 | 7/2009 | Zhou et al. |
| 2011/0279923 A1 | 11/2011 | Miyauchi et al. |
| 2012/0087045 A1* | 4/2012 | Yanagisawa et al. ......... 360/294 |
| 2012/0087046 A1* | 4/2012 | Yanagisawa et al. ......... 360/294 |
| 2012/0250189 A1* | 10/2012 | Degawa et al. ............. 360/235.4 |
| 2012/0281319 A1* | 11/2012 | Singleton et al. .............. 360/319 |
| 2013/0279046 A1* | 10/2013 | Iwasaki et al. ................ 360/244 |
| 2014/0004385 A1* | 1/2014 | Colak et al. ................... 428/815 |

* cited by examiner

*Primary Examiner* — Will J Klimowicz
(74) *Attorney, Agent, or Firm* — Hall Estill Attorneys at Law

(57) ABSTRACT

A magnetic element is generally provided that can be implemented as a data reader. Various embodiments may connect a magnetic stack to a top shield and separate the magnetic stack from a bi-layer side shield. The bi-layer side shield may have a fixed magnetization layer and a soft magnetic layer each magnetically isolated from the top shield.

16 Claims, 4 Drawing Sheets

FIG. 1
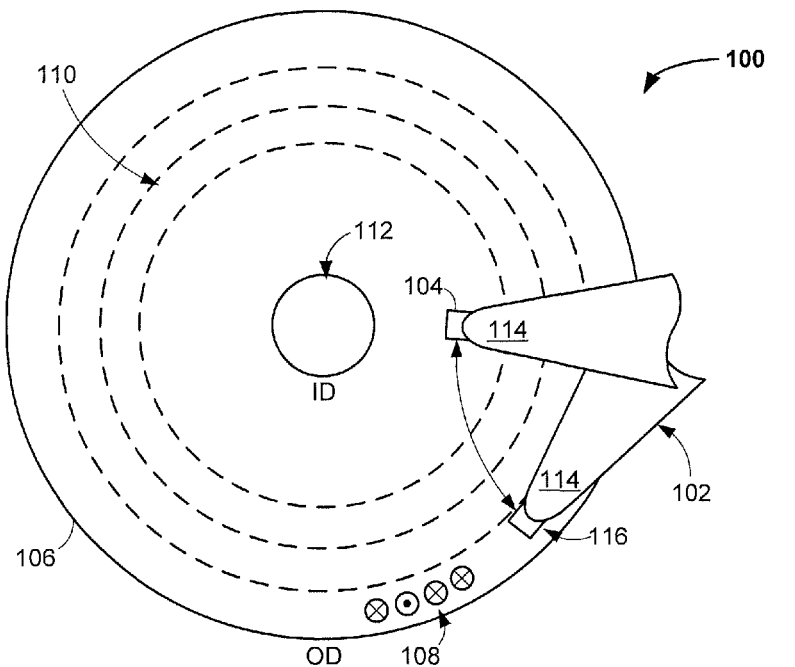
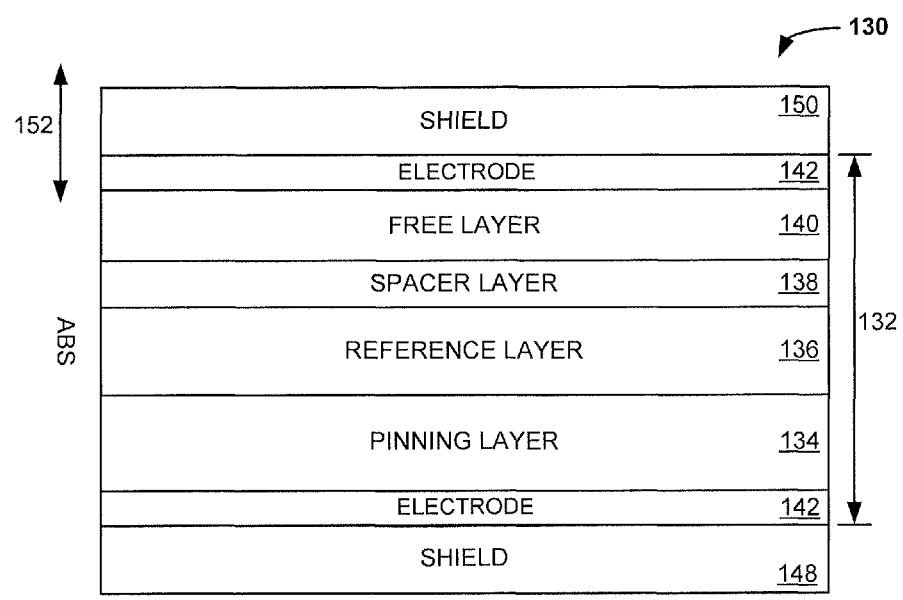
FIG. 2

MAGNETIC ELEMENT WITH A BI-LAYER SIDE SHIELD

SUMMARY

Various embodiments are generally directed to a magnetic element capable of at least magnetic reading.

In accordance with various embodiments, a magnetic stack may be connected to a top shield and separated from a bi-layer side shield. The bi-layer side shield can have a fixed magnetization layer and a soft magnetic layer each magnetically isolated from the top shield.

BRIEF DESCRIPTION OF THE DRAWINGS

FIG. 1 is a block representation of an exemplary portion of a data storage device.

FIG. 2 provides a cross-section block representation of an example magnetic element capable of being used in the data storage device of FIG. 1.

DETAILED DESCRIPTION

Figure 3:
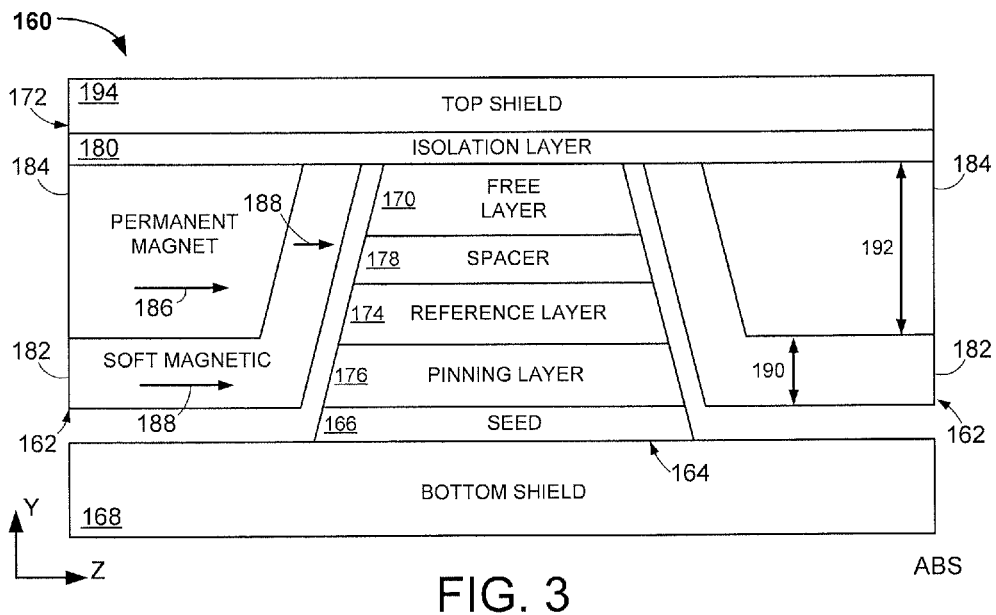
FIG. 3 shows an ABS view block representation of a portion of an example magnetic element constructed in accordance with various embodiments.

Advancing technology has heightened industry demand for decreased form factor devices capable of ever-faster data transfer rates, increased data storage capacity, and more robust data access reliability. Such demand can be accommodated by minimizing the physical size of data bits and the data tracks on which the data bits are organized. However, the reduction of space between data bits and tracks may incur inadvertent data access from adjacent data tracks. The minimization of the size of a data access element to correspond with increased data bit density can further incur noise and reduced performance. Hence, magnetic shielding for reduced form factor magnetic elements that can provide stable operation and mitigate inadvertent adjacent data track access is a continued demand of the data storage industry.

Accordingly, a magnetic element may be configured with a magnetic stack connected to a top shield and separated from a bi-layer side shield that has a fixed magnetization layer and a soft magnetic layer each magnetically isolated from the top shield. Through isolation of the side shield from the top shield allows the bi-layers of the side shield to self-stabilize as the fixed magnetization and soft magnetic layers are tuned with predetermined magnetic moments, coercivities, and pinning strengths to provide precise magnetic shielding without inducing noise and degrading performance of the magnetic stack. The ability to tune the configuration, material, and operational characteristics of the bi-layer side shield further allows for accurate shielding in a variety of magnetic elements and data storage environments.

While at least one tuned magnetic shield may be practiced in an unlimited variety of environments, FIG. 1 generally illustrates a top view block representation of an example data storage device 100 environment that can utilize a tuned magnetic element in accordance with various embodiments. The data storage device 100 is shown in a non-limiting configuration where an actuating assembly 102 is capable of positioning a transducing head 104 over a variety of locations on a magnetic storage media 106 where stored data bits 108 are located on predetermined data tracks 110 configured with an areal density that determines the storage capacity of the media 106. Movement of the storage media 106 can be facilitated through attachment to one or more spindle motors 112 that rotate during use to produce an air bearing surface (ABS) on which a slider portion 114 of the actuating assembly 102 flies to position a head gimbal assembly (HGA) 116, which includes the transducing head 104, over a predetermined portion of the media 106.

The transducing head 104 can be configured with one or more transducing elements, such as a magnetic writer, magnetically responsive reader, and magnetic shields, which operate to program and read data from the selected data tracks 110 of the storage media 106, respectively. In this way, controlled motion of the actuating assembly 102 correspond with alignment of the transducers with the data tracks 110 defined on the storage media surfaces to write, read, and rewrite data. As data bits 108 become more densely positioned in data tracks 110 with smaller radial widths, the head 104 may inadvertently receive magnetic flux from data bits on adjacent data tracks 110, which can induce magnetic noise and interference that degrades performance of the data storage device 100.

It should be noted that the term "stack" is an unlimited term within this disclosure that can be one or more vertically and horizontally aligned layers, constructed of magnetic and non-magnetic material that are capable of magnetic reading and writing. Throughout the present application, the term "stack" will be understood to mean a component that is constructed to respond to external data bits to provide access to external data bits in any operational environment. For example, but not in any way limiting, a magnetic stack may be a data read or write configuration that can differentiate between a plurality of data bits.

An example magnetic element 130 employing a magnetoresistive magnetic stack 132 is shown as a cross-sectional block representation in FIG. 2. The magnetic stack 132 is constructed with a fixed magnetization pinning layer 134 contacting a fixed magnetization reference layer 136 opposite a non-magnetic spacer layer 138 from a magnetically free layer 140. As the free layer 140 responds to an external data bit while the reference layer 136 maintains a fixed magnetization due to the exchange coupling with the pinning layer 134, the external data bit can be read as a logic state. While the presence of fixed and free magnetizations can be characterized as an abutted junction magnetic stack, such configuration is not required or limited as other type of magnetic laminations, such as spin valves, may be used.

While not providing a fixed or free magnetization, electrode layers 142 can be positioned on a single, or opposite sides of the stack 132 and may be constructed as magnetic and non-magnetic seed, cap, and spacer layers in various embodiments. It is contemplated, however, that the magnetic element 130 is constructed without the electrode layers while in other embodiments the composition, shape, and placement of the electrode layers 142 to optimize performance, such as by constricting electrical current to the magnetic stack 132.

Regardless of the configuration of the electrodes 142, as the magnetic element 130 is reduced in size to accommodate greater areal density, the top and bottom shields 148 and 150 may not be able to accurately mitigate the magnetic extent of the magnetic stack 132 across the ABS, which can result in inadvertent side shield reading and decreased element 130. That is, accessing data bits along a particular data track 152 may inadvertently read data bits of adjacent data tracks. With such shielding challenges in mind, at least one side shield can be positioned on either side of the magnetic stack 132 along the Z axis to reduce the magnetic extent of the stack 132 and mitigate accessing errant data bits and data tracks.

However, the construction of a side shield can pose operational difficulties, especially in reduced form factor data storage environments. For example, coupling a side shield to the top 150 or bottom 148 shield can make the side shields too sensitive to variations in stray magnetic fields, which results in variable bias of the free layer 140 and increased noise. As another non-limiting example, constructing the side shields as a lamination of soft and non-magnetic can get stuck in an unwanted magnetic orientation due to the lack of fixed magnetization to stabilize the side shield in view of shielded magnetic flux. Thus, side shield stabilization in minimized data storage environments can be difficult to obtain without a hard magnet while the addition of a hard magnet may impact quiescent magnetic bias and increase noise in the magnetic stack 132.

FIG. 3 displays an ABS view block representation of an example magnetic element 160 configured with side shield laminations 162 tuned to optimize magnetic stack 164 performance without introducing noise and magnetic instability to the magnetic stack 164. The magnetic stack 164 is configured in a substantially trapezoidal shape on the ABS with a seed layer 166 having a larger width, along the Z axis, at the bottom shield 168 than a free layer 170 at the top shield lamination 172. While the trapezoidal shape is by no means required or limiting to the possible configurations of the magnetic stack 164, the trapezoidal shape can provide optimized magnetic performance by having different widths and operational characteristics as the fixed reference 174 and pinning 176 layers have greater surface area than the spacer 178 or free 170 layers.

One or both side shield laminations 162 can be configured to substantially match the sidewall shape of the magnetic stack 164 to provide a continuous common separation distance from the magnetic stack 164 from the seed layer 166 to the isolation layer 180 of the top shield lamination 172. Each side shield lamination 162 is designed and constructed as a bi-layer, which herein means only two layers of material that can be vertically and horizontally configured to provide predetermined shielding configurations.

Various embodiments utilize a soft magnetic layer 182 and permanent magnet layer 184 to provide stable magnetic shielding without detrimentally affecting the free layer 170. That is, the permanent magnet layer 184 can provide a fixed magnetization that is tuned to stabilize the magnetization of the soft magnetic layer 182, but not enough magnetization to disrupt the magnetizations of the magnetic stack 164. To provide such predetermined fixed magnetization, the material construction and orientation of the permanent magnet 184 and soft magnetic 182 layers can be tuned to provide balance between shield stabilization and cross-track magnetic resolution.

As shown, the permanent magnet layer 184 can be separated from the bottom shield 168 and magnetic stack 164 by continuously wrapping the soft magnetic layer 182 around orthogonal sides of the permanent magnet layer 184. Such configuration allows the fixed magnetization 186 to be laterally aligned with and provide bias magnetization to the free layer 170 along the Z axis while buffering the fixed magnetization 186 with the multiple magnetizations 188 afforded by the soft magnetic layer 182 position as close as possible to the magnetic stack 164.

The performance of the bi-layer side shields 162 can be further tuned by controlling the thickness and width of the respective layers 182 and 184. For example, each side shield layer 182 and 184 can have different uniform thicknesses 190 and 192 that create a shield sidewall angle that substantially matches the taper angle of the magnetic stack 164. The tuning of the material of the side shield layers 182 and 184 for coercivity, moment, pinning strength, and exchange coupling can complement the tuned thicknesses 190 and 192 of the respective side shield layers 182 and 184 to provide a predetermined amount magnetic bias, stabilization, and shielding to correspond with the magnetic operation of the magnetic stack 164.

The tuned configuration of the respective side shield layers 182 and 184 can be confined to the lateral regions of the magnetic stack 164, along the Z axis, through the construction of the isolation layer 180 continuously extending between each bi-layer side shield 162 and across the magnetic stack 164. The isolation layer 180 is not limited to a particular thickness or material, but can be tuned to ensure magnetic isolation of the top shield 194 from the respective bi-layer side shields 162. Such magnetic isolation can allow the fixed magnetization 186 of the permanent magnet layer 184 from saturating the top shield 194, which can result in the side shields 162 becoming too magnetically sensitive and inducing a greater than expected bias onto the free layer 170.

Figure 4:
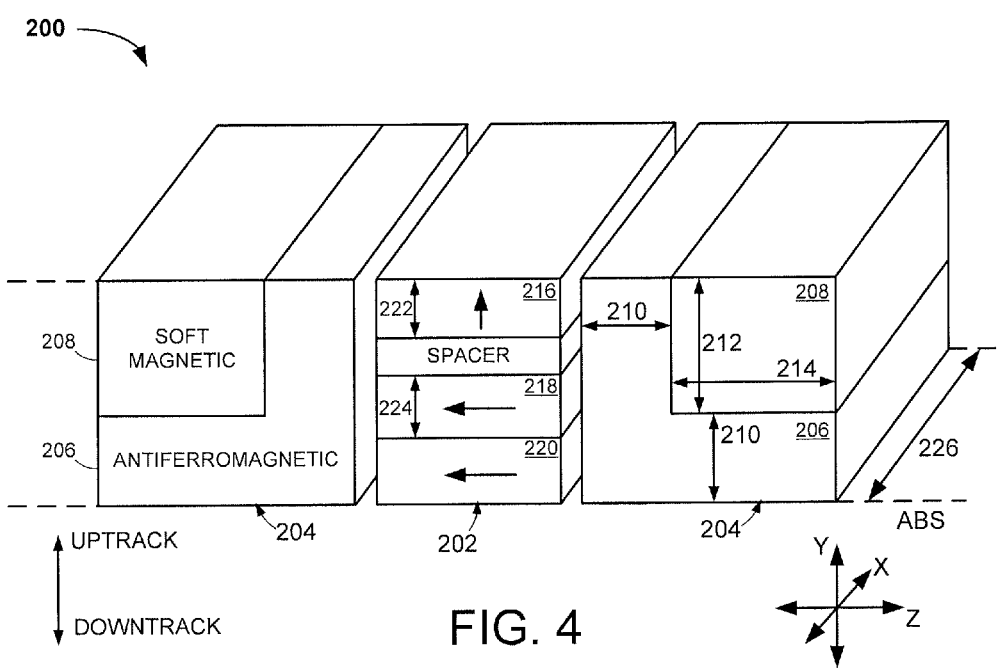
FIG. 4 displays an isometric block representation of a portion of an example magnetic element.

Through the various tuning mechanisms provided by the bi-layer side shields 162, magnetic stack 164, and top shield lamination 172, a wide range of magnetic conditions can be accurately shielded to produce a precise magnetic extent of the magnetic stack 164 that matches an increased areal density data track width. FIG. 4 conveys an isometric block representation of an example magnetic element 200 illustrating how a magnetic stack 202 and bi-layer side shield 204 can be tuned in accordance with some embodiments. As shown, the magnetic stack 202 and bi-layer side shields 204 are configured with a substantially rectangular shaped sidewalls and interlayer seams.

Each bi-layer side shield 204 is electrically and physically separated from the magnetic stack 202 on the ABS while providing a fixed magnetization from an antiferromagnetic material layer 206 and a soft ferromagnetic layer 208. In contrast to the bi-layer side shield configuration shown in FIG. 3, the bi-layer side shields 204 each have the antiferromagnetic layer 206 shaped to provide a continuous sidewall thickness 210 facing the magnetic stack 202 and downtrack along the Y axis. That is, the antiferromagnetic layer 206 is configured with an "L" shape defined by sidewall thicknesses 210 that continuously extend from a horizontal portion, measured along the Z axis, to a vertical portion, along the Y axis.

The varying width configuration of the antiferromagnetic layer 206 may be matched by the soft magnetic layer 208, or constructed in a dissimilar shape such as the rectangular form shown in FIG. 4 having a uniform continuous thickness 212 and width 214. Such a dissimilar shaped soft magnetic layer 208 combined with the antiferromagnetic layer 206 having a uniform thickness 214 wrapping around the soft magnetic layer 208 on two different orthogonal sides allow each bi-layer side shield 204 to have more uniform cross-track magnetic stability along the Z axis. The ability to tune the shapes and positions of the antiferromagnetic 206 and soft magnetic 208 layers can provide shielding and biasing characteristics catered to the magnetic stack, such as the abutted junction stack of FIG. 3 or the trilayer read sensor stack shown in FIG. 4.

The magnetic stack 202 is constructed with a magnetically free 216 layer separated from magnetically fixed 218 and pinning 220 layers by a non-magnetic spacer layer. The stack 202 configuration may allow of smaller shield-to-shield dimensions with thin fixed magnetization structures, such as the fixed 218 and pinning 220, on the ABS needed to set a quiescent state for the free layer 216 that provides a measureable response to external data bits. Various embodiments tune one, or both, side shield layer thicknesses 210 and 212 to be the same, different, or predetermined factors like three times as thick as the free layer 216 thicknesses 222. That is, the side shield layers 206 and 208 can be configured with thicknesses that are chosen in response to the free layer thickness 222 or fixed layer thickness 224 to provide predetermined magnetic shielding profiles in the cross-track direction along the Z axis, the down-track direction along the Y axis, and the stripe height 226 direction along the X axis.

Figure 5:
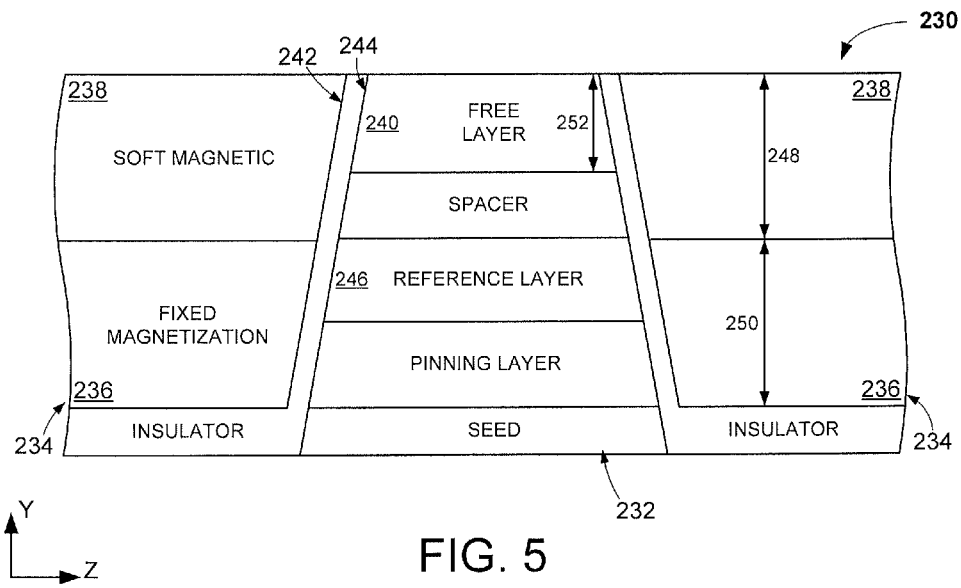
FIG. 5 illustrates an ABS view block representation of a portion of an example magnetic element constructed in accordance with various embodiments.

The tuning possibilities for a magnetic element are not exhausted by the embodiments shown in FIGS. 2 and 3. FIG. 5 generally illustrates another example magnetic element 230 configured with an abutted junction magnetic stack 232 disposed between and physically separated from laterally adjacent bi-layer side shields 234. As shown, the fixed magnetization layer 236, which can be either a high magnetic coercivity permanent magnet or antiferromagnetic material, is positioned down-track from the soft magnetic layer 238 and distal the magnetic stack free layer 240.

The bi-layer side shield 234 configuration with both the fixed magnetization 236 and soft magnetic 238 layers forming a shield sidewall 242 that face a stack sidewall 244 across an insulator material like alumina minimizes the distance between the side shield 234 and the magnetic stack 232, which can make the magnetic extent of the stack 232 conducive to high areal density, reduced track width data environments. The position of the fixed magnetization layer 236 proximal the stack reference layer 246 and distal to the stack free layer 240 can be tuned by adjusting the soft magnetic layer 248 and fixed magnetization 250 thicknesses. That is, the layer thicknesses 248 and 250 of the bi-layer side shields 234 can be adjusted to position the fixed magnetization layer 236 as close to, or as far from, the free layer 240 to produce a predetermined shielding and stack biasing profile.

Figure 6:
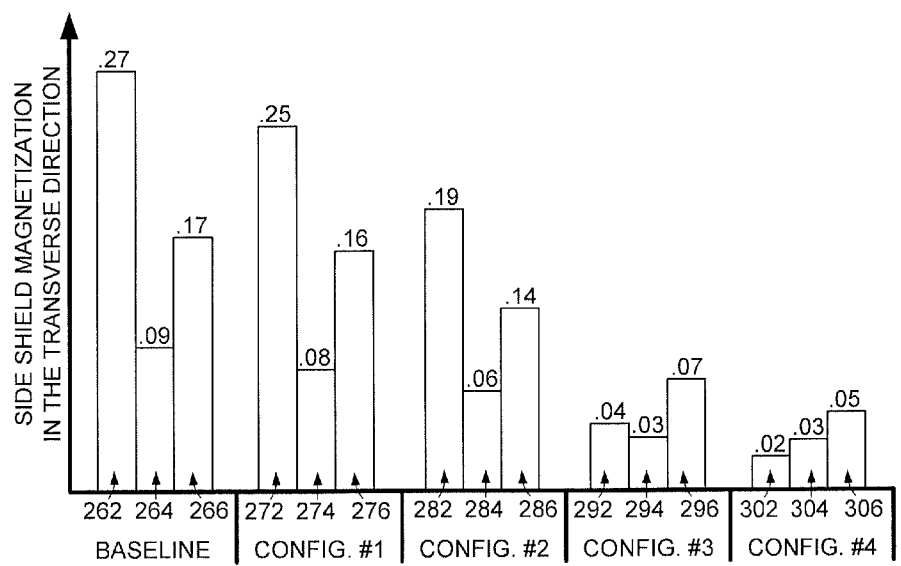
FIG. 6 graphs operational data for various example magnetic elements.

Various embodiments tune the side shield layer thicknesses 248 and 250 in response to the free layer thickness 252 to provide a predetermined side shield 234 stability and free layer 240 magnetic operation. FIG. 6 graphs example operational data corresponding with the side shield magnetizations along a transverse direction for a variety of different bi-layer side shield configurations. The diverse side shield magnetization measurements displayed in FIG. 6 illustrate how the magnetic operation of a magnetic stack and shields can be tuned by altering the bi-layer side shield configuration to provide different side shield magnetizations along the transverse direction, which would be along the Z axis of FIG. 5.

As a baseline, a magnetic element was constructed with only a single soft magnetic layer. Such construction yields roughly a 0.27 magnetization near the stack free layer as shown by bar 262, a 0.09 transverse magnetization amplitude as shown by bar 264, and a 0.17 magnetization during excitation as shown by bar 266. For each measured parameter; magnetization near free layer, transverse magnetization amplitude, and excited magnetization, a lower value corresponds to a more stable side shield and imparted bias field on the magnetic stack. As such, the baseline measurements of bars 262, 264, and 266 display how volatile a side shield can be if a single layer of soft magnetic material is used for the side shields. Similarly, a lamination of soft magnetic and non-magnetic sub-layers can be susceptible to magnetization volatility in the presence of external magnetic flux.

Bars 272, 274, and 276 respectively correspond with a first magnetic element configuration that is similar to the bi-layer side shield 162 of FIG. 3 with a soft magnetic layer having approximately a 12 nm thickness and 12 nm width and wrapped around orthogonal sides of the fixed magnetization providing layer that has roughly a 4 nm thickness. Such a side shield configuration respectively produces a 0.25 magnetization near the stack free layer, a 0.08 transverse magnetization amplitude, and a 0.16 free layer excitation magnetization.

With bars 282, 284, and 286, a similar bi-layer side shield configuration to side shield 162 of FIG. 3 is used, but with an 8 nm width and 8 nm thickness soft magnetic layer and 8 nm thick fixed magnetization providing layer. The matching thicknesses for the soft magnetic layer and fixed magnetization providing layer affords better magnetic stabilization, as shown by a 0.19 free layer magnetization, 0.06 transverse magnetization amplitude, and 0.14 excited free layer magnetization. However, the configuration of the soft magnetic layer as larger or equal to the fixed magnetization providing layer may only be suitable to magnetic stacks like trilayer read sensors where bias magnetization is provided from distal the ABS and not from the side shields.

For abutted junction and spin valve type magnetic stacks where stability and bias magnetization are difficult to obtain for reduced form factor data storage environments, a thinner soft magnetic layer with respect to the fixed magnetization providing layer, whether it be a permanent magnet or antiferromagnet, can lead to optimized performance as evidenced by bars 292, 294, and 296. A 0.04 magnetization near the free layer, 0.03 transverse magnetization amplitude, and 0.07 excited free layer magnetization shows how a soft magnetic layer of roughly 4 nm wide and 4 nm thick surrounding a fixed magnetization providing layer of 12 nm can promote optimized stabilization.

While separating the fixed magnetization providing layer with the soft magnetic layer can serve a purpose with some magnetic stack and magnetic element configurations, such side shield arrangement is not required or limiting. Bars 302, 304, and 306 respectively correspond to the magnetization proximal the stack free layer, transverse magnetization amplitude, and excited free layer magnetization for a bi-layer side shield constructed similar to the side shield 234 of FIG. 5. The 0.02, 0.03, and 0.05 magnetization values for the respective parameters illustrates how placing the soft magnetic layer as close as possible to the stack free layer can promote magnetic stabilization and magnetic stack operation.

Figure 7:
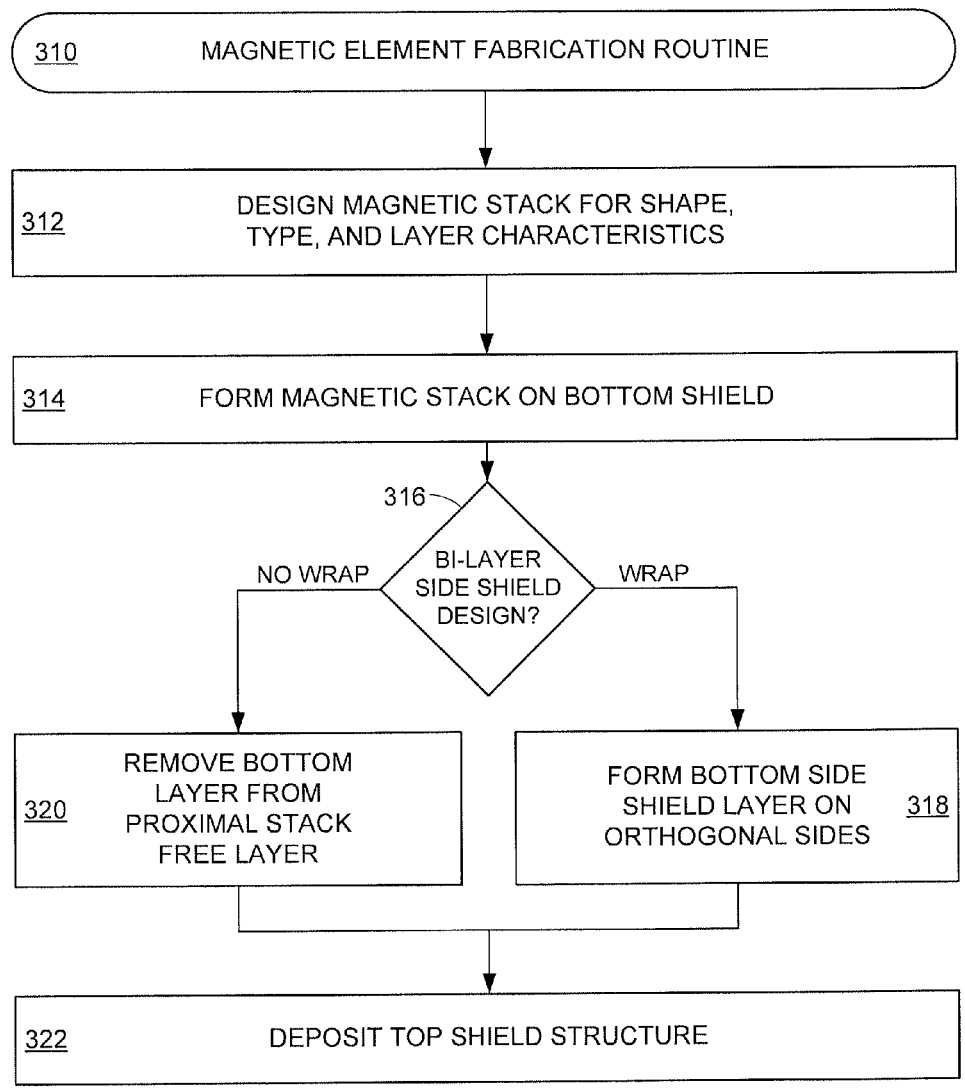
FIG. 7 provides a flowchart illustrating steps of an exemplary magnetic element fabrication routine conducted in accordance with various embodiments.

The various bi-layer side shield configurations displayed in FIG. 6 show how tuned sides shield can provide optimized magnetic element performance through increased magnetic stability balanced with biasing capabilities. The construction of a tuned bi-layer side shield is not restricted to a particular process or procedure, but in some embodiments is conducted in accordance to the example magnetic element fabrication routine 310 conveyed in FIG. 7. Initially, the routine 310 may begin with the design of a magnetic stack in step 312 that is immediately followed by the formation of the magnetic stack onto a bottom shield in step 314. Step 312 is not limited to any design considerations and may result in shaped shield sidewalls, lamination types like abutted junction and trilayer read sensors, and individual stack layer thicknesses and materials.

It is noted that no deposition or lithography means is required or limited and step 314 may be carried out in a series of depositions and processing operations as opposed to a single deposition. The formation of the magnetic stack can be followed by decision 316 where the design of the bi-layer side shields is considered. Considerations of decision 316 may include at least the fixed magnetization providing material, such as a permanent magnet and antiferromagnet, position of each layer with respect to the stack free layer, shape of the respective side shield layers, magnetic moment, magnetic pinning strength, and magnetic coercivity to provide a predetermined side shield magnetic stability and shielding to provide a predetermined read extent of the magnetic stack.

If a wrapped side shield bottom layer is chosen in decision 316, the routine 310 moves to step 318 where the first side shield layer is deposited and left on orthogonal planes proximal the magnetic stack and bottom shield. If a uniform width layer configuration like that shown with side shield 234 of FIG. 5 is chosen from decision 316, any side shield bottom layer material left proximal the free layer of the magnetic stack is removed in step 320 so that continuously uniform bottom and top layers comprise the bi-layer side shield.

With the side shields formed, step 322 deposits a top shield structure that includes at least a shield layer and an isolation layer atop the magnetic stack and each bi-layer side shield, as generally illustrated in FIG. 3, to ensure each bi-layer side shield is magnetically isolated from the top shield layer. Through the routine 310, tuned bi-layer side shields are formed to provide predetermined magnetic stack operation with optimized magnetic stability. However, the routine 310 is not limited as the various steps can be omitted, changed, and added. For example, an additional decision could be made to determine the particular thicknesses and widths of the bi-layer side shield materials.

From routine 310 and the various embodiments of FIGS. 3-5, it can be appreciated that the tuning of a bi-layer side shield lamination can provide optimized operational characteristics for a magnetic element. The ability to tune the shape, material, thickness, stability, and bias of the two side shield layers can provide magnetic operation catered to minimized shield-to-shield spacing magnetic elements as well as a variety of different magnetic stack configurations As such, the present technology allows for the fabrication of a magnetic element capable of operating in larger capacity data storage devices with higher data access accuracy and faster data transfer times.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a magnetic stack connected to a top shield and separated from a bi-layer side shield, the bi-layer side shield comprising a fixed magnetization layer and a soft magnetic layer each magnetically isolated from the top shield, the fixed magnetization layer having a first uniform thickness and the soft magnetic layer having a second uniform thickness, the second uniform thickness continuously extending around multiple sides of the fixed magnetization layer.

2. The apparatus of claim 1, wherein the magnetic stack is configured as an abutted junction read sensor comprising a magnetically free layer and a fixed magnetization reference structure.

3. The apparatus of claim 1, wherein the magnetic stack is configured as a read sensor comprising a magnetically free layer and a magnetically fixed layer.

4. The apparatus of claim 1, wherein the soft magnetic layer is positioned laterally adjacent from a magnetically free layer of the magnetic stack and the fixed magnetization layer is positioned distal the magnetically free layer.

5. The apparatus of claim 1, wherein the fixed magnetization layer comprises a permanent magnet.

6. The apparatus of claim 1, wherein the soft magnetic layer comprises a ferromagnetic material having a predetermined magnetic coercivity.

7. The apparatus of claim 1, wherein the soft magnetic layer continuously wraps around the fixed magnetization layer on at least two different sides.

8. The apparatus of claim 1, wherein the magnetic stack has a stack sidewall and the bi-layer side shield has a shield sidewall, the stack and shield sidewalls tapered at a predetermined angle.

9. The apparatus of claim 1, wherein the fixed magnetization layer is laterally aligned with a magnetically free layer of the magnetic stack.

10. A magnetic element comprising a magnetic stack comlected to a top shield and separated from a bi-layer side shield, the bi-layer side shield comprising a fixed magnetization layer and a soft magnetic layer each magnetically isolated from the top shield by an insulating layer, the fixed magnetization layer having a first uniform thickness and the soft magnetic layer having a second uniform thickness, the first and second uniform thicknesses being different, the second uniform thickness continuously extending around multiple sides of the fixed magnetization layer.

11. The magnetic element of claim 10, wherein the insulating layer continuously extends across the magnetic stack and bi-layer side shield.

12. The magnetic element of claim 10, wherein the soft magnetic and fixed magnetization layers are exchange coupled.

13. The magnetic element of claim 10, wherein the soft magnetic layer is proximal a magnetically free layer of the magnetic stack and the fixed magnetization layer is distal the magnetically free layer.

14. A data reader comprising a magnetic stack connected to top and bottom shields and separated from first and second bi-layer side shields, each bi-layer side shield comprising a fixed magnetization layer and a soft magnetic layer each magnetically isolated from the top shield, the fixed magnetization layer having a first uniform thickness and the soft magnetic layer having a second uniform thickness, the second uniform thickness continuously extending along down-track and cross-track sides of the fixed magnetization layer.

15. The data reader of claim 14, wherein the fixed magnetization and soft magnetic layers are each tuned with different predetermined magnetic moments, coercivities, and pinning strengths.

16. The data reader of claim 14, wherein soft magnetic layer continuously extends about the fixed magnetization layer to physically separate the fixed magnetization layer from the magnetic stack and bottom shield, the soft magnetic layer and fixed magnetization layers meet at a continuously linear interlayer seam.

* * * * *

UNITED STATES PATENT AND TRADEMARK OFFICE
CERTIFICATE OF CORRECTION

PATENT NO.         : 8,885,300 B2                     Page 1 of 1
APPLICATION NO.    : 13/761226
DATED              : November 11, 2014
INVENTOR(S)        : Shaun Eric McKinlay et al.

It is certified that error appears in the above-identified patent and that said Letters Patent is hereby corrected as shown below:

In the Claims

Col. 8, Line 28, Claim 10
replace "com-"
with "col-"

Col. 8, Line 29, Claim 10
replace "lected"
with "nected"

Signed and Sealed this
Seventh Day of April, 2015

Michelle K. Lee
*Director of the United States Patent and Trademark Office*